United States Patent
Sheng et al.

(10) Patent No.: US 9,948,094 B1
(45) Date of Patent: Apr. 17, 2018

(54) POWER LEVEL SWITCHING CIRCUIT FOR A DUAL PORT ADAPTER

(71) Applicant: GOOGLE INC., Mountain View, CA (US)

(72) Inventors: Honggang Sheng, Milpitas, CA (US); Choon Ping Chng, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 522 days.

(21) Appl. No.: 14/591,484

(22) Filed: Jan. 7, 2015

(51) Int. Cl.
H02J 1/00 (2006.01)
H02J 3/14 (2006.01)

(52) U.S. Cl.
CPC ...................................... *H02J 1/00* (2013.01)

(58) Field of Classification Search
CPC .............................................. H02J 1/01–1/90
See application file for complete search history.

(56) References Cited

U.S. PATENT DOCUMENTS

| | | | |
|---|---|---|---|
| 4,652,987 A | 3/1987 | Matthews et al. | |
| 5,995,024 A | 11/1999 | Kambayashi et al. | |
| 7,274,175 B2 | 9/2007 | Manolescu | |
| 7,612,527 B2 | 11/2009 | Hoffman et al. | |
| 7,989,981 B2 | 8/2011 | Zhang | |
| 8,199,672 B1* | 6/2012 | Nachum | H04L 12/4013 370/254 |
| 8,232,785 B2 | 7/2012 | Sun | |
| 8,572,420 B2 | 10/2013 | Dutton et al. | |
| 2002/0070705 A1* | 6/2002 | Buchanan | B60L 11/1811 320/116 |
| 2004/0130292 A1* | 7/2004 | Buchanan | B60L 11/1811 320/116 |
| 2009/0267562 A1 | 10/2009 | Guccione et al. | |
| 2010/0181840 A1 | 7/2010 | Coulson et al. | |
| 2012/0074786 A1* | 3/2012 | Johnson, Jr. | H02J 9/062 307/66 |
| 2012/0086694 A1 | 4/2012 | Tseng et al. | |
| 2012/0223675 A1* | 9/2012 | Bianco | B60L 11/1844 320/109 |
| 2013/0176738 A1* | 7/2013 | Tinaphong | F21V 33/00 362/253 |
| 2014/0009120 A1* | 1/2014 | Kim | H02J 7/0068 320/138 |

(Continued)

OTHER PUBLICATIONS

"Universal Serial Bus Power Delivery Specification", Revision 2.0, V1.0, Aug. 11, 2014, 534 pages.

(Continued)

*Primary Examiner* — Jared Fureman
*Assistant Examiner* — Esayas Yeshaw
(74) *Attorney, Agent, or Firm* — Brake Hughes Bellermann LLP

(57) ABSTRACT

A power brick includes a first port configured to provide power to a first computing device, a second port configured to provide power to a second computing device, a first switch coupled to the first port and configured to select one of a first power configuration and a second power configuration based on a load associated with the second port, and a second switch coupled to the second port and configured to select one of the first power configuration and the second power configuration based on the load associated with the second port.

20 Claims, 9 Drawing Sheets

(56) References Cited

U.S. PATENT DOCUMENTS

| | | | |
|---|---|---|---|
| 2014/0091752 A1 | 4/2014 | Serrano | |
| 2014/0239886 A1* | 8/2014 | Lalitnuntikul | G06F 1/266 |
| | | | 320/107 |
| 2014/0347005 A1* | 11/2014 | Zhou | H02J 7/007 |
| | | | 320/107 |
| 2015/0054451 A1* | 2/2015 | Rokusek | H02M 7/23 |
| | | | 320/108 |
| 2015/0123477 A1* | 5/2015 | Shen | G06F 1/26 |
| | | | 307/52 |
| 2015/0137611 A1* | 5/2015 | Huang | H02J 5/005 |
| | | | 307/104 |
| 2016/0126788 A1* | 5/2016 | Liao | H02J 7/0068 |
| | | | 307/23 |
| 2016/0190813 A1* | 6/2016 | Kumar | H02J 7/0016 |
| | | | 307/18 |

OTHER PUBLICATIONS

"Universal Serial Bus Type-C Cable and Connector Specification", Release 1.0, Aug. 11, 2014, pp. 1-171 pages.

* cited by examiner

POWER LEVEL SWITCHING CIRCUIT FOR A DUAL PORT ADAPTER

TECHNICAL FIELD

Embodiments relate to power adaptors, wall chargers or power bricks for powering and/or charging batteries associated with computing devices.

BACKGROUND

Generally, in traditional consumer device applications (e.g., smartphone, laptop, tablet, and the like), powering the consumer device can include using a power adaptor, a wall charger and/or a power brick (herein after referred to as a power brick) that is configured to provide power to multiple consumer devices. The power provided to each of the consumer devices can be at multiple power settings including multiple voltage and current levels based on the power brick and consumer device configurations.

SUMMARY

According to example embodiments, a power adaptor, a wall charger and/or a power brick (herein after referred to as a power brick) can provide power to multiple consumer devices. The power brick can switch power settings associated with ports providing power to the consumer devices based on a load associated with at least one of the consumer devices.

In a general aspect, a power brick includes a first port configured to provide power to a first computing device, a second port configured to provide power to a second computing device, a first switch coupled to the first port and configured to select one of a first power configuration and a second power configuration based on a load associated with the second port, and a second switch coupled to the second port and configured to select one of the first power configuration and the second power configuration based on the load associated with the second port.

In another general aspect, a method includes providing a first power to a first computing device via a first port of a power brick, providing a second power to a second computing device via a second port of a power brick, switching the first port of the power brick to the second power based on a load associated with the second port, and switching the second port of the power brick to the first power based on the load associated with the second port.

In still another general aspect, a power brick includes a first port configured to provide power to a first computing device, a second port configured to provide power to a second computing device, and a power module configured to selectively provide one of two power settings to the first port and the second port based on a load associated with the second port.

Implementations can include one or more of the following features. For example, the load associated with the second port is detected as a current on a return path from the second computing device. The first switch can be configured to select the first power configuration in a default state, and the second switch can be configured to select the second power configuration in the default state. The first switch can include a first resistor configuration, a second resistor configuration, and a transistor configured to select between the first resistor configuration and the second resistor configuration based on a current associated with the load associated with the second port. The second switch can include a first resistor configuration, a second resistor configuration, and a transistor configured to select between the first resistor configuration and the second resistor configuration based on a current associated with the load associated with the second port.

For example, the power brick can further include a sensor configured to amplify a current associated with the load associated with the second port, generate a voltage based on the amplified current, compare the voltage to a reference voltage, and output a comparison current based on the comparison of the voltage to the reference voltage. The first power configuration and the second power configuration can generate different power outputs. The first power configuration and the second power configuration can generate a same voltage output and a different current output. The first port can include a first serial interface, and the second port can include a second serial interface, an output current for the first port is determined based on a current associated with a configuration contact of the first serial interface, and an output current for the second port is determined based on a current associated with a configuration contact of the second serial interface.

DETAILED DESCRIPTION OF THE EMBODIMENTS

Figure 1:
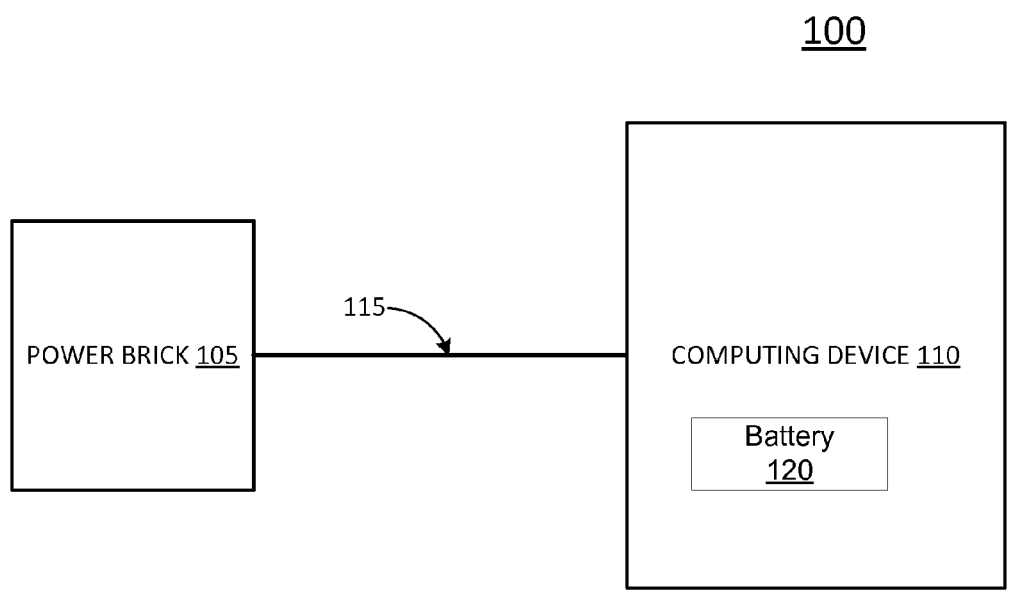
FIG. 1 is a schematic block diagram of a system according to at least one example embodiment.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Furthermore, the figures are intended to illustrate the general characteristics of methods and/or structure utilized in certain example embodiments and to supplement the written description provided below. These figures are not, however, to scale and may not precisely reflect the precise structural or performance characteristics of any given embodiment, and should not be interpreted as defining or limiting the range of values or properties encompassed by example embodiments. For example, the structural elements may be reduced or exaggerated for clarity. The use of similar or identical reference numbers in the various drawings is intended to indicate the presence of a similar or identical element or feature.

FIG. 1 is schematic block diagrams of a system according to at least one example embodiment. As shown in FIG. 1 a system 100 includes a power 105 and a computing device 110. The power brick 105 and the computing device 110 are communicatively coupled via a cable 115. The cable 115 is also configured to transfer power from the power brick 105 to the computing device 110. The computing device 110 may use the transferred power to power the computing device (e.g., provide power to a processor, a display, and/or the like) and/or charge a battery 120.

The computing device 110 may also be configured to communicate and/or negotiate a desired power to the power brick 105 via the cable 115. The desired power may include information related to a power, a voltage, a current, a charging status (e.g., full, charging, type of charge and/or the like). For example, the computing device 110 may negotiate a charging status including a fast charge that may indicate a voltage and current that will charge a battery (or provide an excess of power) as compared to a normal charging status.

The power brick 105 may also be configured to power more than one computing device 110 or a plurality of computing devices 110. Accordingly, the power brick may include more than one (e.g., two or more) port or a plurality of ports. The power brick 105 may be configured to switch between two or more power settings (e.g., voltage and current levels) for each of the two or more ports in order to power each of the more than one computing device 110 at a same or a different power setting. In an example implementation, the power brick can have two ports. A first of the two ports can be configured at a first power setting (e.g., 5V, 3 A) and a second of the two ports can be configured at a second power setting (e.g., 5V, 1.5 A). The power brick 105 may be configured to switch the power setting of the first port and the second port. In other words, the first of the two ports can switched to the second power setting (e.g., 5V, 1.5 A) and the second of the two ports can be configured at the first power setting (e.g., 5V, 3 A). Example embodiments are not limited to two power settings. For example, there can be a plurality of variable and/or fixed power settings.

Figure 2:
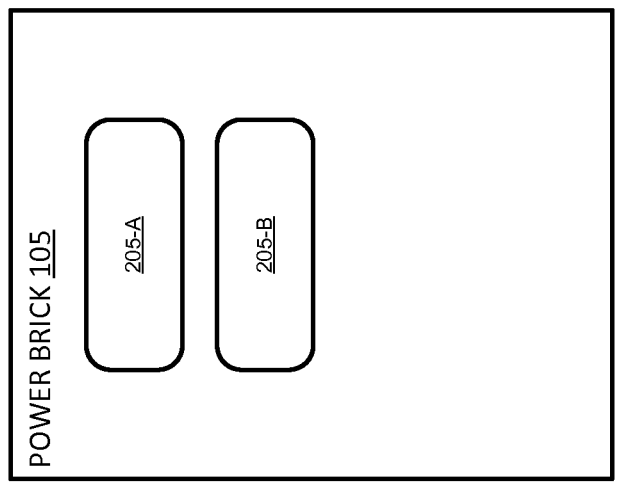
FIG. 2 is a block diagram of a power brick according to at least one example embodiment.

FIG. 2 is a block diagram of a power brick according to at least one example embodiment. As shown in FIG. 2, the power brick 105 includes a first port 205-A and a second port 205-B. Although two ports are shown, example embodiments are not limited thereto. The first port 205-A and the second port 205-B each may be coupled with a cable (e.g., cable 115). Accordingly, the first port 205-A and the second port 205-B each may be configured to provide power to a computing device. As described above, each of the first port 205-A and the second port 205-B may be configured to transfer power to computing devices at a same or a different power setting.

Figure 3:
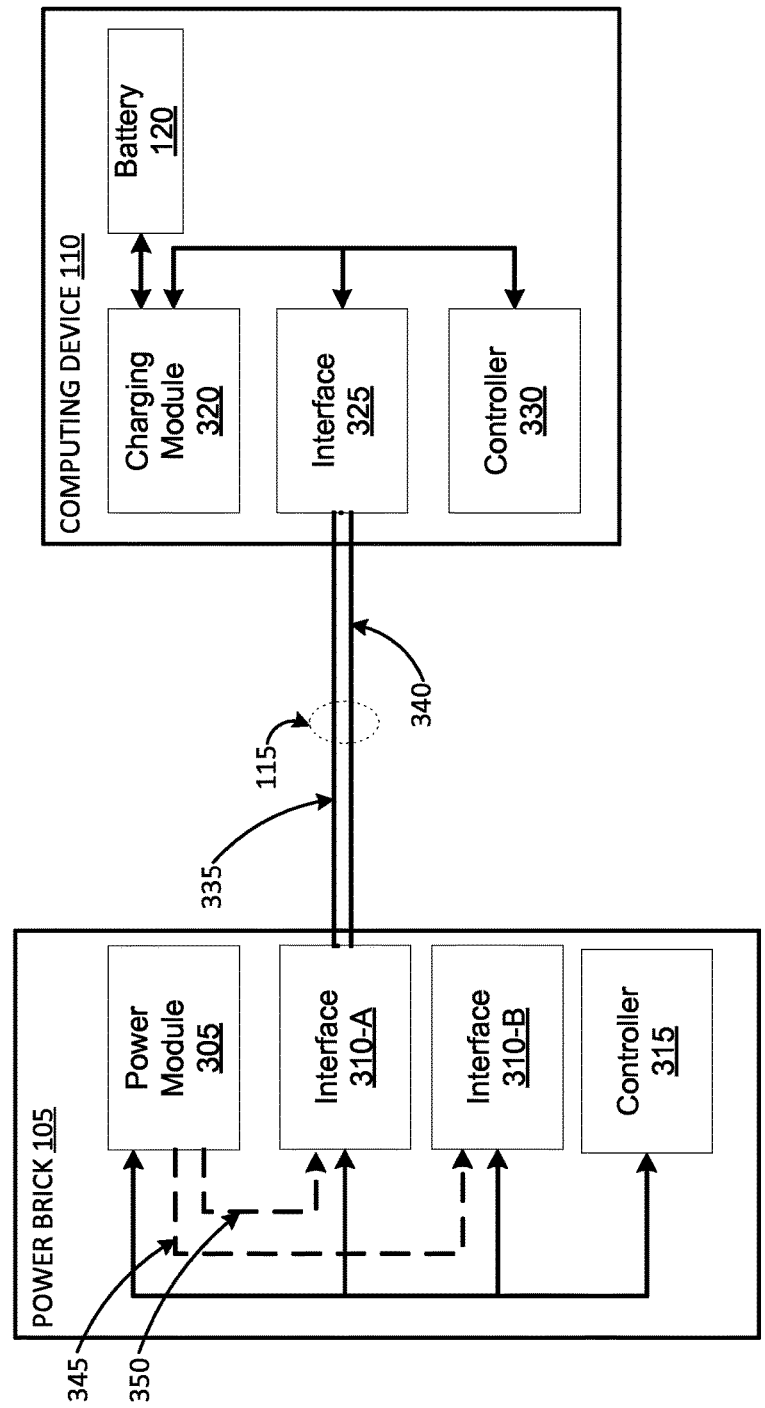
FIG. 3 is a schematic block diagram of a system according to at least one example embodiment.

FIG. 3 is a schematic block diagram of a system according to at least one example embodiment. As shown in FIG. 3 a system 300 includes the power brick 105 and the computing device 110. The power brick 105 and the computing device 110 are communicatively coupled via the cable 115. The power brick 105 includes a power module 305, interfaces 310A and 310-B, and a controller 315. The computing device 110 includes a charging module 320, an interface 325, a controller 330, and the battery 120. The cable 115 includes at least one cable 335 configured to transfer power from the power brick 105 to the computing device 110 and at least one cable 340 configured to carry communication signal between the power brick 105 and the computing device 110.

The cable 115 can include a plurality of cables configured for various purposes. For example, one or more of the plurality of cables of the cable 115 can be configured to transfer power between devices. For example, one or more of the plurality of cables of the cable 115 can be configured to carry communications signals between devices. As shown in FIG. 3, the cable 115, including the at least one cable 335 and the at least one cable 340, can be communicatively coupled to (e.g., between) the interface 310 and the interface 325. In some implementations, the cables 335 and 340 are one and the same. The at least one cable 335 configured to transfer power from the power brick 105 to the computing device 110 can include a bus cable and a ground cable.

The power module 305 may be configured to convert AC to DC and transform a voltage associated with a wall outlet to a voltage associated with the computing device 110. The power module 305 may be configured to generate two or more power settings. For example, the power module 305 may generate a voltage and current based on a first power setting and provide the voltage and current based on the first power setting to the interface 310-A via bus 345. Further, the power module 305 may generate a voltage and current based on a second power setting and provide the voltage and current based on the second power setting to the interface 310-B via bus 350.

The power module 305 may be configured to switch between two or more power settings (e.g., voltage and current levels) for each of the two or more ports in order to power each of the more than one computing device 110 at a same or a different power setting. In an example implementation, the power module 305 can generate a voltage and current (e.g., 5V, 3 A) based on a first power setting and can generate a voltage and current (e.g., 5V, 1.5 A) based on a second power setting. The power module 305 may be configured to provide the voltage and current to a corresponding interface 310-A and 310-B via a corresponding bus 345, 350. The power module 305 may be configured to switch the power setting associated with a corresponding bus 345, 350. In other words, bus 345 can be associated with a first power setting at a first point in time and switched to a second power setting at a second point in time. Example embodiments are not limited to two power settings. For example, there can be a plurality of variable and/or fixed power settings.

The interfaces 310-A and 310-B may be configured to couple DC power from the power brick 105 to a corresponding at least one cable 335 of the cable 115 (e.g., via a connector of the cable 115). The interfaces 310-A and 310-B may be configured to attach the cable 115 (or a connector of the cable 115) to the power brick 105 in order to facilitate DC power transfer between the power brick 105 and the computing device 110. In an example implementation, the interfaces 310-A and 310-B may be a Universal Serial Bus (USB) connector (e.g., USB 1.0, USB 2.0, USB 3.0, micro-USB, mini-USB, Type-C USB and the like).

The controller 315 may be configured to receive information from the computing device 110 via the at least one cable 340 and the interface 310. The information may be associated with a negotiation of a desired power (for each coupled computing device) from the power brick 105 via the cable 115. The desired power may include information related to a power, a voltage, a current, a charging status (e.g., full, charging, type of charge and/or the like). For example, in addition to negotiating sufficient power to support the computing device 110, the computing device 110 may negotiate a charging status including a fast charge that may indicate a voltage and current that can charge a battery (or provide an excess of power) as compared to a normal charging status. Although the desired power may be negotiated, the power brick may be configured to provide an initial default power (e.g., voltage and current) to the computing device 110 based on a fixed setting (e.g., as controlled by controller 315).

The controller 315 may be configured to receive signals from the power module 305. The signals may indicate at least one of a power, a voltage and a current associated with the power module 305 (and, therefore, the power brick 105). The controller 315 may be configured to disconnect or cause the power module 305 to stop (or reduce) transferring DC power should at least one of the power, the voltage and the current associated with the power module 305 exceed a threshold value. The controller 315 may be configured to disconnect or cause the power module 305 to stop (or reduce) transferring DC power should other signals associated with the power brick 105 (e.g., generated by a temperature detector) indicate a parameter exceeds a threshold value.

The charging module 320 may be configured to charge battery 120 using power received from the power brick 105 via the at least one cable 335 of the cable 115. The charging module 320 may be configured to monitor a status of the battery 120. For example, the charging module 320 may measure a voltage, a current, a temperature and the like of the battery. The charging module 320 may be configured to monitor a charging status of the battery 120. For example, the charging module 320 may monitor whether or not the battery 120 is fully charged or charging, an error associated with charging the battery 120 and/or the like.

The interface 325 may be configured to attach the cable 115 (e.g., using a connector of the cable 115) to the computing device 110 in order to facilitate communications between the power brick 105 and the computing device 110. The interface 325 may be configured to send/receive communications from the computing device 110 via the at least one cable 340 of the cable 115. The interface 325 may be configured to communicate the communications to the controller 330. The interface 325 may be configured as a conduit for sending/receiving serial communications (e.g., using a serial protocol). For example, the interface 310 may be a Universal Serial Bus (USB) connector (e.g., USB 1.0, USB 2.0, USB 3.0, micro-USB, mini-USB, Type-C USB and the like). The interface 325 may be configured to receive DC power from the power brick 105 via the at least one cable 335 of the cable 115 in order to charge the battery 120.

The controller 330 may be configured to communicate information to the power brick 105 via the at least one cable 340 and the interface 325. The information may be associated with a negotiation of a desired power from the power brick 105 via the cable 115. The desired power may include information related to a power, a voltage, a current, a charging status (e.g., full, charging, type of charge and/or the like). In an example implementation, the controller 330 may be configured to cause the computing device 110 to draw a load that in turn causes or triggers a change in a power configuration of the power brick 105. In other words, the power brick 105 may provide more or less power to the computing device 110 based on the load the computing device 110 places on the power brick 105.

The controller 330 may be configured to disconnect or cause the charging module 320 to stop (or reduce) charging the battery 120 should at least one of the power, the voltage and the current associated with the charging module 320 exceed a threshold value. The controller 330 may be configured to disconnect or cause the charging module 320 to stop (or reduce) charging the battery 120 should other signals associated with the battery 120 (e.g., generated by a temperature detector) indicate a parameter exceeds a threshold value. The controller 330 may be configured to communicate a status of the battery 120 and/or battery 120 charge to the power brick 105. The status of the battery 120 and/or battery 120 charge may include a battery capacity, a charge amount, a time to full charge, a voltage, a current, a charging power, a temperature, a charging status (e.g., full/charging), an error(s) associated with charging the battery and/or the like.

The controller 330 may be configured to enable a fraction of the power received via interface 325 to be used for powering the computing device 110. For example, the power may be used to power a processor, a memory and/or a display associated with the computing device. A remaining fraction may be used to charge the battery 120. In some example implementations, all of the power is used to power the computing device 110. In some example implementations, all of the power is used to charge the battery 120.

Figure 4:
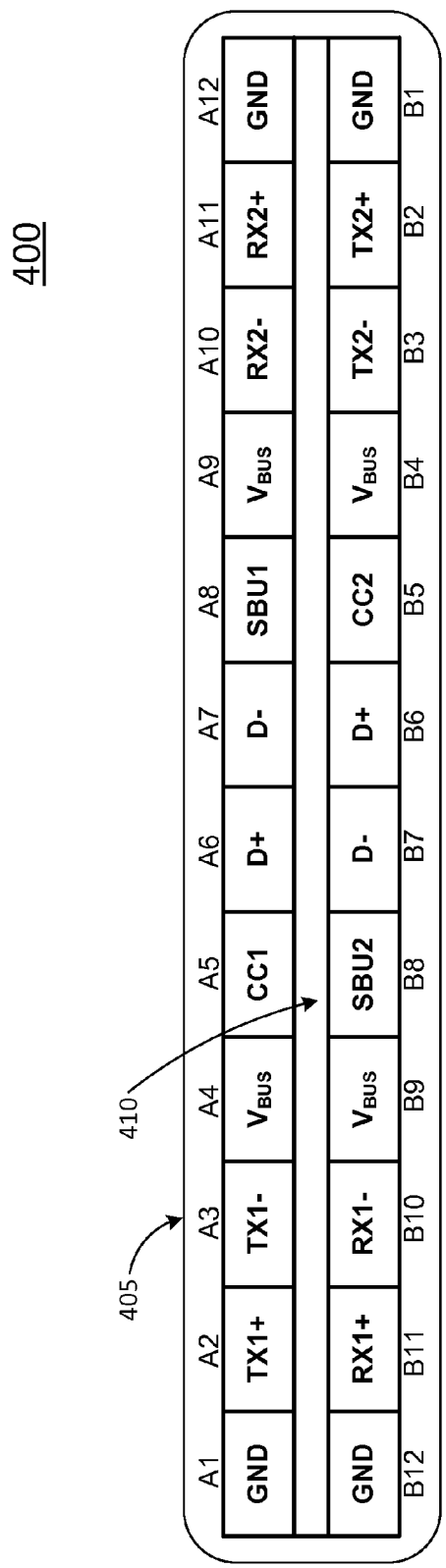
FIG. 4 is a block diagram illustrating a structure of serial interface according to at least one example embodiment.

FIG. 4 is a block diagram illustrating a structure of serial interface according to at least one example embodiment. As shown in FIG. 4, the serial interface 400 can include a plurality of contacts (or pins) A1 to A12 and B1 to B12. Contact A1, A12, B1 and B12 can be ground contacts. Contacts A2 and A3 (TX1+, TX1−), B2 and B3 (TX1+, TX1−) can form differential pairs in a high speed transmission (TX or transmit end) line or path. Contacts A10 and A11 (RX2−, RX2+), B10 and B11 (RX1−, RX1+) can form differential pairs in a high speed transmission (RX or receive end) line or path. Contacts A4, A9, B4 and B9 can be bus power ($V_{Bus}$) contacts. Contacts A5 and B5 (CC1, CC2) can form a configuration channel. Contacts A6, A7, B6 and B7 (D+, D−) can form a differential pair in a transmission line or path. Contacts A8 and B8 can form a channel as a side band use (SBU). As shown in FIG. 4, the serial interface 400 can further include an outer body or shell 405. The outer body or shell 405 can be configured to help hold a mated pair of interfaces. Further, in a receptacle (jack or female) interface, element 410 can be a void in which a plug (or male) interface can be inserted. In another implementation of a plug (or male) interface, element 410 can be a printed circuit board on which the contacts are formed which can be configured to be inserted into a corresponding receptacle.

In an example implementation, interface 310-A, 310-B and interface 325 can be serial interfaces. Accordingly, interface 310-A, 310-B and interface 325 can include the structure of serial interface 400. As such, the power brick 105 can provide power to the computing device 110 using the structure of serial interface 400. For example, the power brick 105 can provide power to the computing device 110 using contact A9, A4 and/or B9, B4 ($V_{BUS}$) and A1, A12, B1 or B12 (GND) of the structure of serial interface 400. Further, the power brick 105 and the computing device 110 can be configured to communicate using the structure of serial interface 400. For example, the power brick 105 and the computing device 110 can be configured to communicate (e.g., to negotiate a desired power or charging status) using contact A5 (CC1) or B5 (CC2), as a configuration channel, of the structure of serial interface 400.

Figure 5:
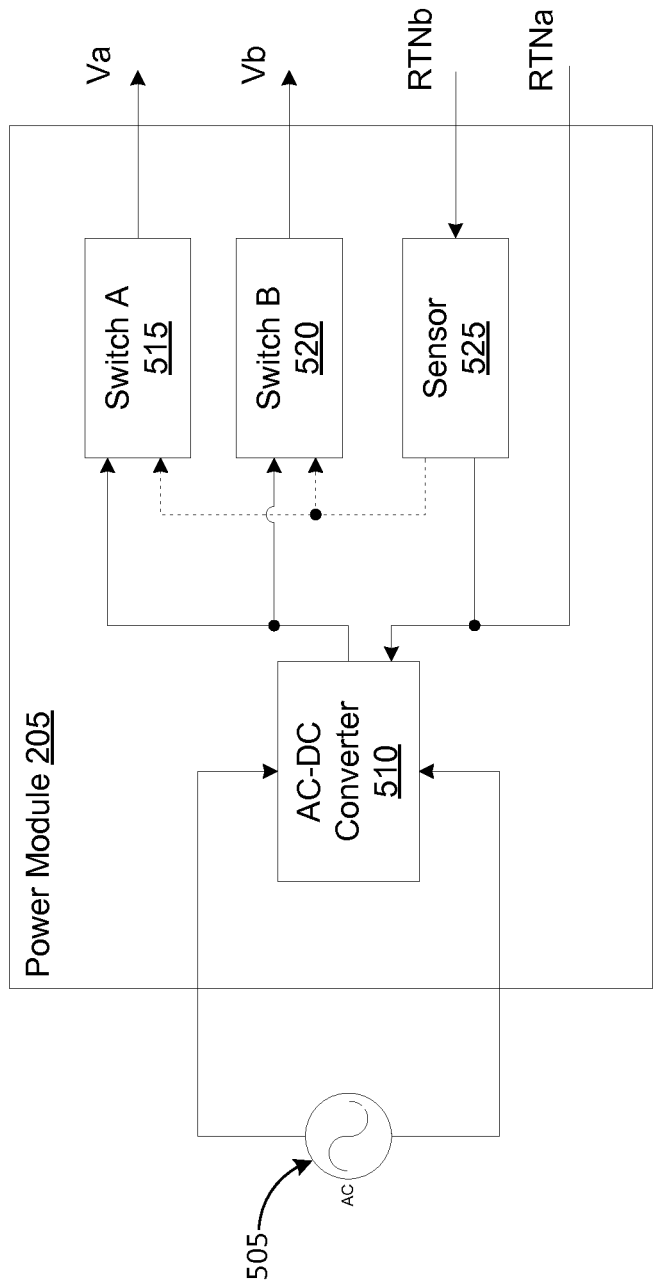
FIG. 5 is a schematic block diagram of a power module of the power brick according to at least one example embodiment.

FIG. 5 is a schematic block diagram of a power module of the power brick according to at least one example embodiment. As shown in FIG. 5, the power module 205 can include an AC-DC converter 510, a switch A 515, a switch B 520 and a sensor 525. The AC-DC converter 510 may be, for example, a transformer, a rectifier (half-wave, full-wave and/or variations thereof), a switched mode power supply, and/or the like. The AC-DC converter 510 may be configured to provide a fixed DC output based on an AC input 505.

The AC-DC converter 510 may be configured to provide a variable DC output based on an AC input 505. The AC-DC converter 510 may be configured to provide a plurality of DC outputs based on an AC input 505. In an example implementation, the AC-DC converter 510 can be configured to provide two fixed DC voltage outputs based on an AC input 505 each drawing a different current. For example, the AC-DC converter 510 may be configured to generate a first DC output of five volts (5V) and a current of three amps (3 A) and generate a second DC output of five volts (5V) and a current of one and a half amps (1.5 A). In an example implementation, the current may be based on other components (e.g., load(s)) downstream from the AC-DC converter 510. These are just examples and the disclosure is not limited thereto.

Switch A 515 and switch B 520 may be configured to switch between outputs of the AC-DC converter 510 based on, for example, a default setting of the power brick 105 and/or a negotiated power for at least one computing device 110. The power brick 105 can include two or more output ports. Therefore, one power brick 105 can support more than one computing device 110. Alternatively, two ports can power one computing device 110 if the computing device 110 needs more power than one port can support. In other words, the switch A 515 and switch B 520 may be configured to provide one of at least two outputs (e.g., 5V, 3 A and 5V, 1.5 A) based on switching between one of two power configurations (e.g., resistor configurations). The output of switch A 515, labeled as Va, can power a first computing device (e.g., as a first output of power brick 105). The output of switch A 520, labeled as Vb, can power a second computing device (e.g., as a second output of power brick 105). In an example implementation, at a first point in time switch A 515 can select the first DC output of five volts (5V) and a current of three amps (3 A) and switch B 520 can select the second DC output of five volts (5V) and a current of one and a half amps (1.5 A). At a second (e.g., later in time) point in time, switch A 515 and switch B 520 may be triggered to select the opposite DC output of the AC-DC converter 510. For example, a maximum current level can be used to inform the computing device 110 through the CC pin so that the computing device 110 can draw the current based on the power brick port current capacity. In other words, switch A 515 may select the second DC output and switch B may select the first DC output. The switch may be triggered based on a voltage or current as detected by sensor 525. For example, switch A 515 can select its DC output when the CC pin voltage level is changed. Therefor the communication can be associated with changing a voltage/current on a single CC wire.

Sensor 525 may be configured to detect a current associated with the load (e.g., power draw of a computing device 110) associated with switch B (e.g., Vb) or on RTNb whereas a current associated with the load (e.g., power draw of a computing device 110) associated with switch A (e.g., Va) or on RTNa is un-sensed or un-detected. Alternatively, or in addition to, the sensor 525 can sense current on the bus side instead of RTNb side. Or, placing the sensor 525 on one port which can reduce cost and power loss on the sensor 525. In an example implementation, the power brick 105 can be configured to provide 5V and 22.5 W. However, this disclosure is not limited thereto. As such, Va and Vb can each provide 5V and separately provide a current that combined does not cause the power brick to exceed 22.5 W. In this example implementation, Vb can have an associated initial or default setting of 3 A and Va can have an associated initial or default setting of 1.5 A. Accordingly, Va (e.g., through the first port 205-A) can (as a default) provide 7.5 W and Vb (e.g., through the second port 205-B) can (as a default) provide 15 W (7.5 W+15 W=22.5 W). However, the default current setting could be exchanged. For example, Va default current can be 3 A, Vb with a sensor default current set to 1.5 A.

In the example implementation, Vb (e.g., through the second port 205-B) has the sensor 525. As such, Vb (e.g., through the second port 205-B) can be implemented as a master to Va (e.g., through the first port 205-A) as a slave. Accordingly, upon determining that a current associated with Vb (as detected by sensor 525) is less than 1.5 A, switch B 520 can be switched (or changed) to have a current setting of 1.5 A and switch A 515 can be switched (or changed) to have a current setting of 3 A. The current setting is can inform the computing device 110 of the port output current capability. Therefore, when the port of power brick 105 communicates to the computing device 110 that it is set to 1.5 A. The computing device 110 may not draw more than 1.5 A in normal operation. Accordingly, the shifting level will be slightly lower than its setting, such as 1.4 A. When the computing device draws more than 1.4 A, approaching 1.5 A, the master port will change its setting to 3 A in order to provide more power to computing device 110, the slave port has to reduce its current setting to meet the total brick output current capacity. Therefor, upon determining that a current associated with Vb (as detected by sensor 525) is greater than (and/or equal to) 1.4 A, switch B 520 can be switched (or changed) back to having a current setting of 3 A and switch A 515 can be switched (or changed) back to have a current setting of 1.5 A. Although FIG. 5 illustrates sensor 525 as being associated with Vb (e.g., through the second port 205-B), this disclosure is not limited thereto. In other words, sensor 525 can be associated with Vb (e.g., through the second port 205-B) or Va (e.g., through the first port 205-A).

Figure 6:
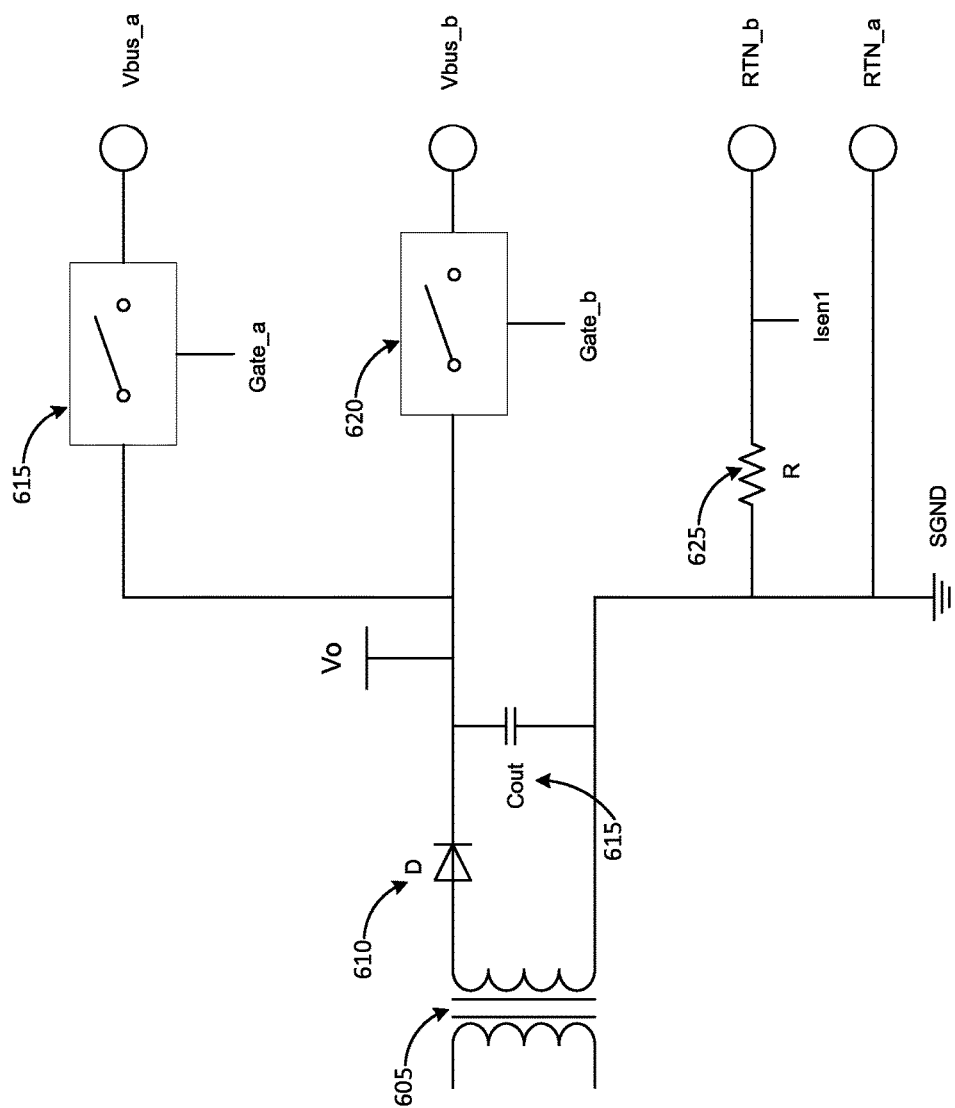
FIGS. 6, 7, 8A and 8B are schematic diagrams of elements of the power module according to at least one example embodiment.

FIGS. 6, 7, 8A and 8B are schematic diagrams of elements of the power module according to at least one example embodiment. FIG. 6 illustrates a schematic block diagram of the (or a portion of the) power module 205. As shown in FIG. 6, the power module 205 includes a transformer 605, a diode (or transistor) 610 and a capacitor 615. The transformer 605, the diode 610 and the capacitor 615 may collectively form the AC-DC converter 510 (described above) having an output Vo. Although not shown, the transformer 605 can be configured to provide a variable voltage (e.g., as configured by controller 315). For example, the transformer 605, can include a plurality of tap positions that are set based on a desired voltage. Further, the transformer 605, can be configured to output a plurality of voltages (or there can be a plurality of transformers 605) which may necessitate a plurality of the diode 610 and the capacitor 615. Accordingly, there may be a plurality of outputs Vo (e.g., Vo1, Vo2 . . . ) each separately coupled to a switch. In other words, switch 615 and switch 620 could have separate distinct inputs.

As shown in FIG. 6, the power module 205 includes switch 615 and switch 620. Switch 615 may be configured to output Vbus_a having a voltage based on Vo (or equal to Vo) and a current drawn (e.g., by computing device 110) based on the position of the switch 615. For example, switch 615 may be a transistor that switches state (e.g., between open and closed) based on a voltage Gate_a. Switch 620 may be configured to output Vbus_b having a voltage based on Vo (or equal to Vo) and a current drawn (e.g., by computing device 110) based on the position of the switch 620. For example, switch 620 may be a transistor that switches state (e.g., between open and closed) based on a voltage Gate_b. Switch 615 and switch 620 may correspond to switch A 515 and switch B 520, respectively.

Resistor 625 (associated with RTN_B) may be configured to provide a load through which a current Isen1 can be detected. The resistance of resistor 625 may be small enough to have minimal (or no) affect on the efficiency of the power brick 105, but large enough so that an associated current can be detected. For example, the resistance of resistor 625 may be, for example, in the range of 2 mΩ to 25 mΩ. In an example implementation, the resistance of resistor 625 can be 5 mΩ.

Figure 7:
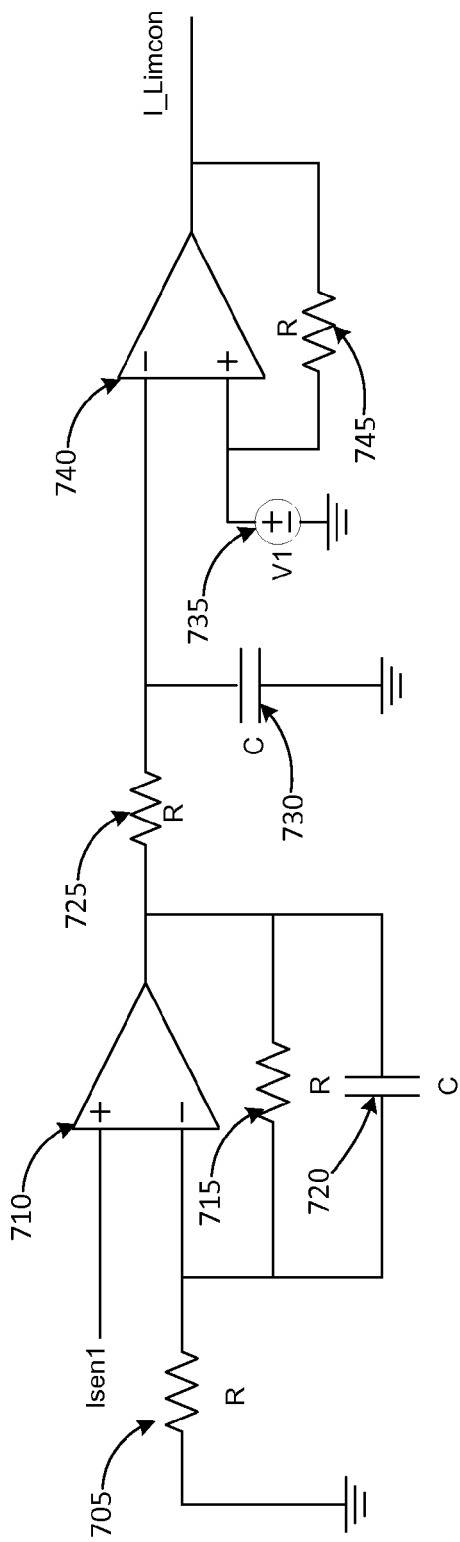

FIG. 7 illustrates a schematic block diagram of the (or a portion of the) sensor 525. The sensor 525 can be configured to amplify the detected current Isen1, generate a voltage based on the amplified detected current, compare the voltage to a reference voltage and output a comparison current I_Limcon based on the comparison of the voltage and the reference voltage. the As shown in FIG. 7, the sensor 525 includes a resistor 705, an op-amp 710, a resistor 715 and a capacitor 720. Collectively, the resistor 705, the op-amp 710, the resistor 715 and the capacitor 720 form an amplifier configured to amplify the current Isen1 (see FIG. 6). The gain of the amplifier can be based on the resistance values of the resistor 705 and the resistor 715. The sensor 525 further includes a resistor 725 and a capacitor 730. Collectively, the resistor 725 and the capacitor 730 form a low pass filter configured to filter high frequency noise from the associated amplified Isen1. The sensor 525 further includes a reference voltage 735, an op-amp 740 and a resistor 745. Collectively, the reference voltage 735, the op-amp 740 and the resistor 745 form a comparator configured to compare the voltage across capacitor 730 to the reference voltage 735. The comparator is configured to output a current I_Limcon based on the comparison of the voltage across capacitor 730 to the reference voltage 735.

Continuing the example implementation described above, the resistance values of the resistor 705 and the resistor 715 can be set to values that cause the gain of the amplifier to be, for example, 100. Accordingly, a 3 A load associated with Vb (e.g., through the second port 205-B) with a resistance of resistor 625 set to 5 mΩ can cause a voltage drop of 1.5V across capacitor 730. The value of the reference voltage 735 can be set to generate a value of the current I_Limcon such that the switch 615 and the switch 620 are triggered to switch at about a 1.5 A load associated with Vb (e.g., through the second port 205-B). In an example implementation, the value of the reference voltage 735 can be set to generate a value of the current I_Limcon such that the switch 615 and the switch 620 are triggered to switch at about a 1.4 A load. In an example implementation, the current setting can be changed from 3 A to 1.5 A first, and then change 1.5 A to 3 A in order avoid triggering OCP during current setting transition. Accordingly, the value of the reference voltage 735 can be set to 0.7V in order to trigger the switch 615 and the switch 620 to switch at about a 1.4 A load associated with Vb (e.g., through the second port 205-B).

Figure 8B:
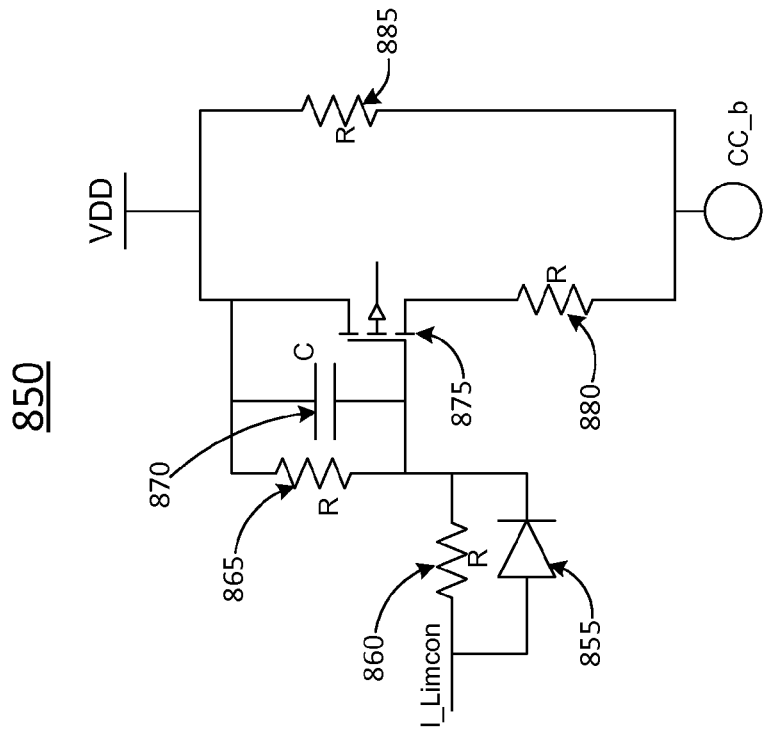
Figure 8A:
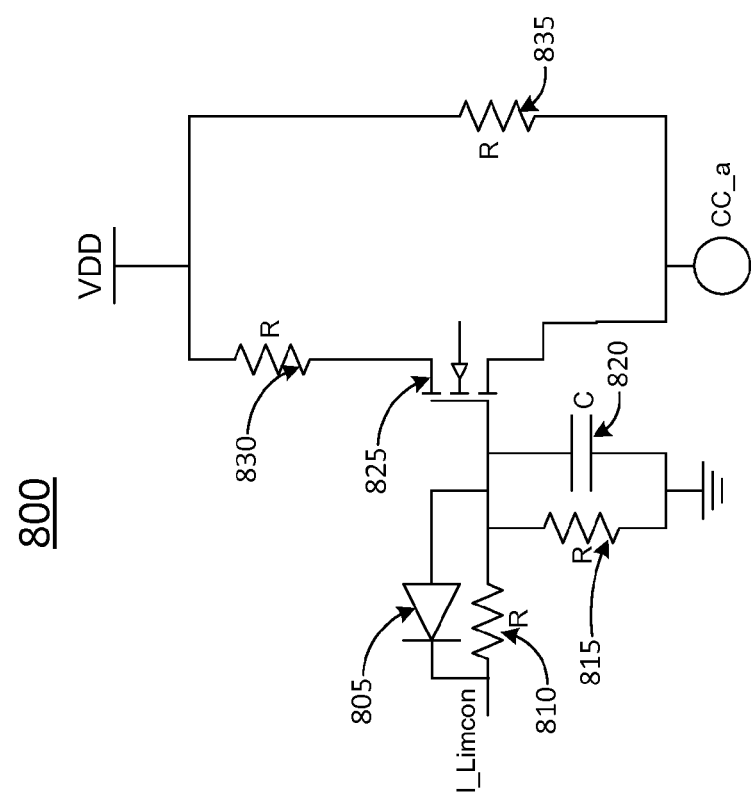

FIG. 8A illustrates a schematic block diagram of the (or a portion of the) a first current setting circuit 800 (e.g., as an element or switching element of the switch 515 and/or the switch 615). As shown in FIG. 8A, the first current setting circuit 800 includes a transistor 825 (shown as a n-channel field-effect transistor or NFET) with a gate circuit, including a diode 805, resistors 810, 815 and a capacitor 820, coupled to the gate of the transistor 825 and a drain-source circuit, including resistors 830, 835, coupled across the drain and the source of the transistor 825. The gate circuit has I_Limcon (see FIG. 7) as an input and the drain-source circuit outputs a voltage to CC_a. The output of the drain-source circuit is a voltage based on VDD and a current based on resistor 830 and/or resistor 835 depending on a channel resistance of the transistor 825. In other words, the output current of the drain-source circuit can be based on resistor 830 in parallel with resistor 835 if the transistor 825 is conducting (e.g., essentially a short circuit) or resistor 835 if the transistor 825 is not conducting (e.g., essentially an open circuit).

In an example implementation, the current setting for each port (e.g., of the first port 205-A and of the second port 205-B) of the power brick 105 can be determined by the CC pin (e.g., of the interface 400). Accordingly, the current setting for one port of the power brick 105 (e.g., the first port 205-A) can be based on resistor 830 in parallel with resistor 835 if the transistor 825 is conducting (e.g., essentially a short circuit) or resistor 835 if the transistor 825 is not conducting (e.g., essentially an open circuit).

The interface 400 can include two CC pins, CC1 and CC2. However, in an example implementation, one pin can be connected with a load to the adapter port while the other is not connected. Therefore, the first current setting circuit 800 output, CC_a, can be the CC1 contact or the CC2 contact of the first port (e.g., the first port 205-A) of the power brick 105.

Continuing the example above, VDD can be Vo (see FIG. 6) and/or voltage regulated from Vo, resistor 835 can be set to a value to draw a current of 1.5 A and resistor 830 in parallel with resistor 835 can be set to a value to draw a current of 3 A. Accordingly, controlling one resistor can change the output current level setting.

FIG. 8B illustrates a schematic block diagram of the (or a portion of the) second current setting circuit 850 (e.g., as an element or switching element of the switch 520 and/or the switch 620). As shown in FIG. 8B, the second current setting circuit 850 includes a transistor 875 (shown as a p-channel field-effect transistor or PFET) with a gate circuit, including a diode 855, resistors 860, 865 and a capacitor 870, coupled to the gate of the transistor 875 and a drain-source circuit, including resistors 880, 885, coupled across the drain and the source of the transistor 875. The gate circuit has I_Limcon (see FIG. 7) as an input and the drain-source circuit outputs a voltage to CC_b. The output of the drain-source circuit is a voltage based on VDD and a current based on resistor 880 and/or resistor 885 depending on a channel resistance of the transistor 875. In other words, the output current of the drain-source circuit can be based on resistor 880 in parallel with resistor 885 if the transistor 875 is conducting (e.g., essentially a short circuit) or resistor 885 if the transistor 875 is not conducting (e.g., essentially an open circuit).

In an example implementation, an output current for the each port can be determined based on a current associated with a configuration contact of an interface of the port. For example, the current setting for each port (e.g., of the first port 205-A and of the second port 205-B) of the power brick 105 can be determined by the CC contact (e.g., of the interface 400). Accordingly, the current setting for one port of the power brick 105 (e.g., the second port 205-B) can be based on resistor 880 in parallel with resistor 885 if the transistor 875 is conducting (e.g., essentially a short circuit) or resistor 885 if the transistor 875 is not conducting (e.g., essentially an open circuit).

The interface 400 can include two CC pins, CC1 and CC2. However, in an example implementation, one pin can be connected with a load to the adapter port while the other is not connected. Therefore, the second current setting circuit 800 output, CC_b, can be the CC1 contact or the CC2 contact of the second port (e.g., the second port 205-B) of the power brick 105.

Continuing the example above, VDD can be Vo (see FIG. 6) and/or voltage regulated from Vo, resistor 835 can be set to a value to draw a current of 1.5 A and resistor 830 in parallel with resistor 835 can be set to a value to draw a current of 3 A. So that we just need to control one resistor to change the current level setting.

In the example implementation shown in FIGS. 8A and 8B, an NFET is used to control the first port (e.g., the first port 205-A) and a PFET is used to control the second port (e.g., the second port 205-B). However example embodiments are not limited thereto. In an example implementation, if I_Limcon is high, the second port PFET (e.g., transistor 875) is off, only resistor 885 is connected to the CC_b contact so that the second port is set to 1.5 A, and the first port NFET is on, resistor 830 is in parallel with resistor 835, the total resistance of resistor 830‖resistor 835 can set the first port to 3 A. A polarity of I_Limcon can be changed so along as I_Limcon can exchange the power level for each port.

Figure 9:
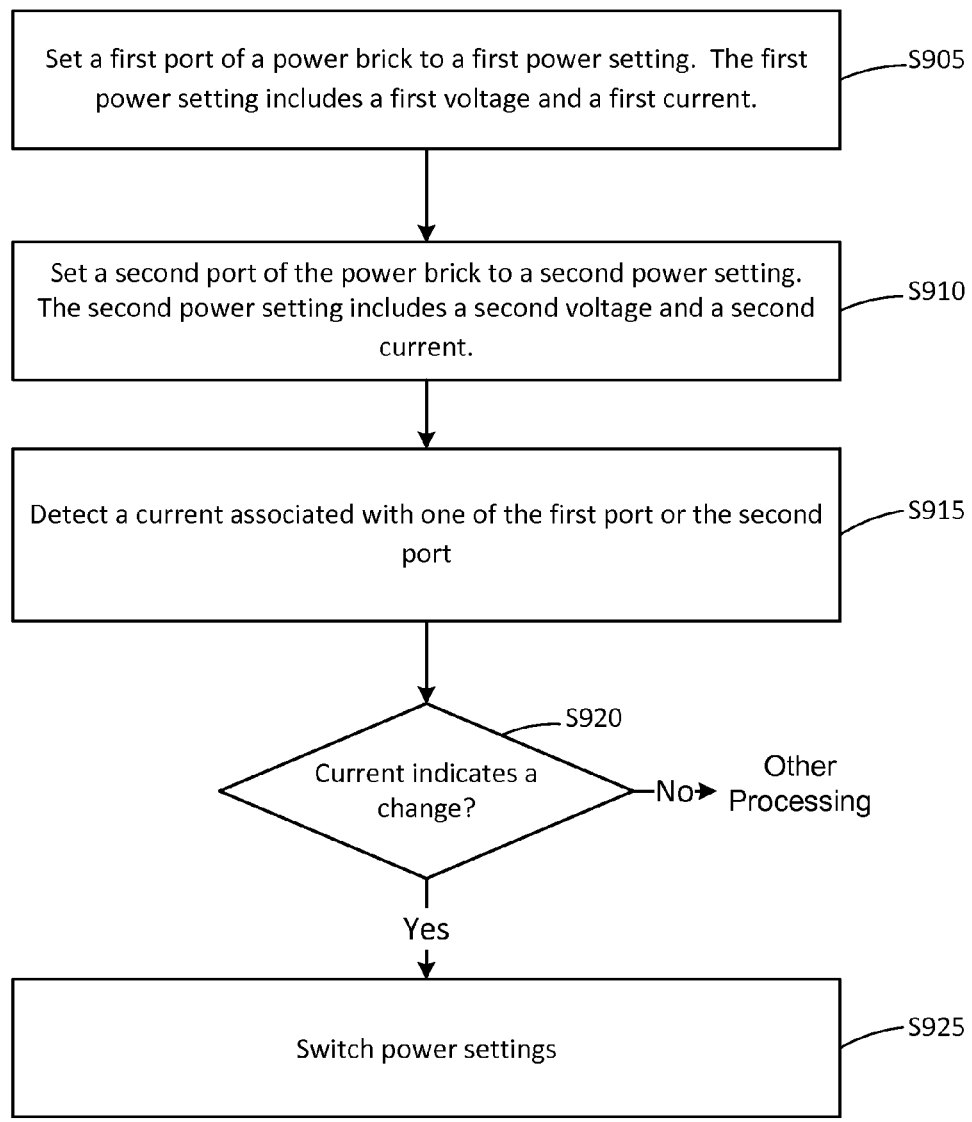
FIG. 9 is a flowchart of a method according to at least one example embodiment.

FIG. 9 is a flowchart of a method according to at least one example embodiment. As shown in FIG. 9, in step S905 a first port of a power brick is set to a first power setting. The first power setting includes a first voltage and a first current. In one example implementation, the first power setting can be a default power setting. In another example implementation, the first power setting can be a negotiated power setting. The negotiated power setting can be as negotiated by a computing device coupled (through an interface) with the power brick.

In step S910 a second port of the power brick is set to a second power setting. The second power setting includes a second voltage and a second current. In one example implementation, the second power setting can be a default power setting. In another example implementation, the second power setting can be a negotiated power setting. The negotiated power setting can be as negotiated by a computing device coupled (through an interface) with the power brick. According to an example implementation, the first power setting and the second power setting are different power settings. For example, the first power setting can be 15 W and the second power setting can be 7.5 W. A voltage associated with the first power setting and a voltage associated with the second power setting can be the same. Accordingly, a current associated with the first power setting and a current associated with the second power setting can be different.

In step S915 a current associated with one of the first port or the second port is detected. In one example implementation, a current associated with the second port is detected. In another example implementation, a current associated with the first port is detected. As discussed above, the detected current (e.g., Isen1) is detected on the return path (e.g., RTN_b) of associated with a voltage bus over which power is provided to a load (e.g., computing device 110).

In step S920 whether the detected current indicates a change is determined. In one example implementation, the detected current can be compared to switching current. For example, the detected current can be converted to an equivalent voltage (e.g., a voltage drop across a capacitor) which is then compared to a reference voltage (e.g., reference voltage 735). If the detected current indicates a change, processing continues to step S925. Otherwise, some other processing is performed.

In step S925 the power settings are switched. In one example implementation, the first port of the power brick is set to the second power configuration or setting and the second port of the power brick is set to the first power configuration or setting. For example, a resistor configuration in a switching element changes based on the detected current. As described above, a first switch associated with the first port changes a resistor configuration causing a current setting to change. The current setting can change from a current setting associated with the first power setting to a current setting associated with the second power setting based on the resistor configuration. Further, a second switch associated with the second port changes a resistor configuration causing a current setting to change. The current setting can change from a current setting associated with the second power setting to a current setting associated with the first power setting based on the resistor configuration.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a controller, a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether that particular combination has been specifically enumerated in the accompanying claims at this time.

What is claimed is:

1. A power brick comprising:
   a first port configured to provide power to a first computing device;
   a second port configured to provide power to a second computing device;
   a first switch coupled to the first port and configured to select one of a first resistor configuration and a second resistor configuration based on a current draw of a load associated with the second computing device coupled to the second port; and
   a second switch coupled to the second port and configured to select one of the first resistor configuration and the second resistor configuration based on the current draw of the load associated with the second computing device coupled to the second port.

2. The power brick of claim 1, wherein the load associated with the second port is detected as a current on a return path from the second computing device.

3. The power brick of claim 1, wherein
   the first switch is configured to select the first resistor configuration in a default state, and
   the second switch is configured to select the second resistor configuration in the default state.

4. The power brick of claim 1, wherein
the first switch includes a transistor configured to select between the first resistor configuration and the second resistor configuration based on a current associated with the load associated with the second port.

5. The power brick of claim 1, wherein
the second switch includes a transistor configured to select between the first resistor configuration and the second resistor configuration based on a current associated with the load associated with the second port.

6. The power brick of claim 1, further comprising:
a sensor configured to amplify a current associated with the load associated with the second port,
generate a voltage based on the amplified current,
compare the voltage to a reference voltage, and
output a comparison current based on the comparison of the voltage to the reference voltage.

7. The power brick of claim 1, wherein the first resistor configuration and the second resistor configuration generate different power outputs.

8. The power brick of claim 1, wherein the first resistor configuration and the second resistor configuration generate a same voltage output and a different current output.

9. The power brick of claim 1, wherein
the first port includes a first serial interface, and
the second port includes a second serial interface,
an output current for the first port is determined based on a current associated with a configuration contact of the first serial interface, and
an output current for the second port is determined based on a current associated with a configuration contact of the second serial interface.

10. A method comprising:
providing a first power based on a first resistor configuration to a first computing device via a first port of a power brick;
providing a second power based on a second resistor configuration to a second computing device via a second port of a power brick;
switching the first port of the power brick to the second power based on a current draw of a load associated with the second computing device coupled to the second port; and
switching the second port of the power brick to the first power based on the current draw of the load associated with the second computing device coupled to the second port.

11. The method of claim 10, wherein the load associated with the second port is detected as a current on a return path from the second computing device.

12. The method of claim 10, further comprising:
selecting the first power for the first port in a default state, and
selecting the second power for the second port in the default state.

13. The method of claim 10, wherein switching the first port includes using a transistor configured to select between the first resistor configuration and the second resistor configuration based on a current associated with the load associated with the second port.

14. The method of claim 10, wherein switching the second port includes using a transistor configured to select between the first resistor configuration and the second resistor configuration based on a current associated with the load associated with the second port.

15. The method of claim 10, further comprising:
amplifying a current associated with the load associated with the second port,
generating a voltage based on the amplified current,
comparing the voltage to a reference voltage, and
outputting a comparison current based on the comparison of the voltage to the reference voltage.

16. The method of claim 10, wherein the first resistor configuration and the second resistor configuration generate different power outputs.

17. The method of claim 10, wherein
the first port includes a first serial interface, and
the second port includes a second serial interface,
an output current for the first port is determined based on a current associated with a configuration contact of the first serial interface, and
an output current for the second port is determined based on a current associated with a configuration contact of the second serial interface.

18. A power brick comprising:
a first port configured to provide power to a first computing device;
a second port configured to provide power to a second computing device; and
a power module configured to selectively provide one of two power settings to the first port and the second port based on a current draw of a load associated with the second computing device coupled to the second port, the two power settings being based on a resistor configuration.

19. The power brick of claim 18, wherein the load associated with the second port is detected as a current on a return path from the second computing device.

20. The power brick of claim 18, wherein
the power module includes a first switch configured to select a first resistor configuration in a default state, and
the power module includes a second switch configured to select a second resistor configuration in the default state.

* * * * *